US008762377B2

(12) United States Patent
Kuo et al.

(10) Patent No.: US 8,762,377 B2
(45) Date of Patent: Jun. 24, 2014

(54) CANDIDATE KEY RETRIEVING APPARATUS, CANDIDATE KEY RETRIEVING METHOD AND TANGIBLE MACHINE-READABLE MEDIUM THEREOF

(75) Inventors: Tei-Wei Kuo, Banciao (TW); Chi-Sheng Shih, Taipei (TW); Ren-Shan Luoh, Taipei (TW); Pei-Lun Suei, Fongyuan (TW); Che-Wei Kuo, Anding Township (TW); Min-Siong Liang, Zhongli (TW)

(73) Assignee: Institute for Information Industry, Taipei (TW)

( * ) Notice: Subject to any disclaimer, the term of this patent is extended or adjusted under 35 U.S.C. 154(b) by 436 days.

(21) Appl. No.: 12/627,798

(22) Filed: Nov. 30, 2009

(65) Prior Publication Data
US 2011/0119280 A1 May 19, 2011

(30) Foreign Application Priority Data
Nov. 16, 2009 (TW) ................................ 98138825 A

(51) Int. Cl.
*G06F 7/00* (2006.01)
*G06F 17/30* (2006.01)

(52) U.S. Cl.
USPC ........................................ 707/737; 707/769

(58) Field of Classification Search
USPC .................................................. 707/737, 769
See application file for complete search history.

(56) References Cited

U.S. PATENT DOCUMENTS

| 6,564,154 B1* | 5/2003 | Hood et al. ...................... 702/24 |
| 2001/0000536 A1* | 4/2001 | Tarin .............................. 707/102 |
| 2004/0225865 A1* | 11/2004 | Cox et al. ......................... 712/34 |
| 2006/0200825 A1* | 9/2006 | Potter, Jr. ....................... 718/100 |
| 2008/0059412 A1 | 3/2008 | Tarin |
| 2009/0157524 A1* | 6/2009 | Cullen, III ....................... 705/26 |
| 2010/0114841 A1* | 5/2010 | Holenstein et al. ............ 707/690 |

OTHER PUBLICATIONS

Office Action rendered by Taiwan Intellectual Property Office (TIPO) in the Taiwan counterpart patent application to the present US application, Mar. 29, 2013; 7 pages, including translation.

* cited by examiner

*Primary Examiner* — Kuen Lu
(74) *Attorney, Agent, or Firm* — Skaar Ulbrich Macari, P.A.

(57) ABSTRACT

A candidate key retrieving apparatus, a candidate key retrieving method and a tangible machine-readable medium thereof are provided. The candidate key retrieving apparatus comprises a storage unit and a microprocessor. The storage unit is configured to store a table recording a data amount of the table, a plurality of attributes, and a data distinct amount and a data type of each attribute. The microprocessor is configured to generate a candidate key according to the data amount, the distinct amounts and the data types.

12 Claims, 5 Drawing Sheets

CANDIDATE KEY RETRIEVING APPARATUS, CANDIDATE KEY RETRIEVING METHOD AND TANGIBLE MACHINE-READABLE MEDIUM THEREOF

PRIORITY

This application claims priority to Taiwan Patent Application No. 098138825 filed on Nov. 16, 2009, the disclosure of which is incorporated by reference herein in its entirety.

FIELD

The present invention relates to a candidate key retrieving apparatus, a candidate key retrieving method and a tangible machine-readable medium thereof. More specifically, the present invention relates to a candidate key retrieving apparatus, a candidate key retrieving method and a tangible machine-readable medium thereof that can generate a candidate key according to information recorded in a table.

BACKGROUND

With advent of the digital times, data storage has evolved from recording data on the conventional paper to recording data on digitalized media, and a database has appeared in order to store a mass of digital data. To effectively manage data stored in the database, an information clerk has to integrate and analyze the data to be stored, a table having logic relationships is therefore generated to facilitate subsequent usage and maintenance of the data.

Taking data of all student basic information in a school for an example, the table might have to record information (e.g. classes, genders, blood types and the like) of hundreds of students, which infers a huge mass of information. Typically, to facilitate efficient subsequent management, the information clerk may execute a series of normalization processing procedures on the table in order to avoid repeated data or contradictory data in the table, so that the table is convenient to use and maintain. However, the normalization processing must be performed by a candidate key of the table. Simply speaking, the candidate key indicates an identification indicator for distinguishing between different data.

For example, Table I, below, is a table recording basic information of students, the table records "Student Nos." and "Genders" of four students. The "Student No." and the "Gender" may be referred as an attribute of Table I respectively, and the candidate key is selected from various attribute combinations of the table.

TABLE I

|  | 1 | 2 | 3 | 4 |
|---|---|---|---|---|
| Student No. | A001 | A002 | A003 | A004 |
| Gender | Female | Female | Male | Female |

More specifically, Table I has three attribute combinations, i.e., "Student No.", "Gender" and "Student No.+Gender", in addition, the candidate key of Table I selected from the three attribute combinations must satisfy requirements of uniqueness and minimality. Uniqueness implies that the number of aspects exhibited by an attribute combination must be greater than or equal to the data amount of the table. Taking Table I as an example, it records four pieces of data, since each student has a distinct student No., the attribute combination "Student No." has at least four aspects. The attribute combination "Student No." is adequate to distinguish among the data pieces recorded in Table I, therefore satisfies the requirement of uniqueness.

Likewise, the attribute combination "Student No.+Gender" exhibits at least four aspects, which means that it also satisfies the requirement of uniqueness. However, the attribute combination "Gender" can only exhibit two aspects (either "Female" or "Male") which are less than the data amount (4 pieces) recorded in Table I, the attribute combination "Gender" fails to satisfy the requirement of uniqueness and will be eliminated from a list of potential candidate keys. Furthermore, because the attribute combinations "Student No.+Gender" and "Student No." satisfy the requirement of uniqueness, a determination of minimality will be made next.

Minimality implies that an attribute number of attributes contained in an attribute combination is required to be smaller. As described above, both the attribute combinations "Student No." and "Student No.+Gender" satisfy the requirement of uniqueness, but the attribute combination "Student No.+Gender" contains two attributes of "Student No." and "Gender", while the attribute combination "Student No." only contains a single attribute of "Student No.", the attribute combination "Student No.+Gender" will be eliminated since a candidate key must satisfy the requirement of minimality. On the other hand, the attribute combination "Student No." which satisfies both the requirements of uniqueness and minimality will be set as the candidate key of Table I. In the prior art, unfortunately the candidate key of the table is searched manually by determining the uniqueness and minimality of attribute combinations, which not only makes retrieving the candidate key inefficient, but also lowers the probability of retrieving the correct candidate key due to a lack of experience information clerk.

In view of this, there is a continuing need in the art to make retrieving candidate keys more accurate and efficient.

SUMMARY

An objective of certain embodiments of the present invention is to provide a candidate key retrieving apparatus. The candidate key retrieving apparatus comprises a storage unit and a microprocessor electrically connected to the storage unit. The storage unit is configured to store a table recording a data amount of the table, a plurality of attributes, a data distinct amount of each attribute and a data type of each attribute. The microprocessor is configured to generate a first attribute combination according to the attributes and the data type of each attribute. The first attribute combination comprises at least one selected attribute, which is one of the plurality of attributes. The microprocessor is further configured to determine that a product of the data distinct amount of the at least one selected attribute of the first attribute combination is greater than or equal to the data amount, generate a determination result according to an attribute number of the at least one selected attribute of the first attribute combination, and set the first attribute combination as a candidate key according to the determination result.

Another objective of certain embodiments of the present invention is to provide a candidate key retrieving method for the candidate key retrieving apparatus described above. The candidate key retrieving method comprises the steps of: (a) enabling the microprocessor to generate a first attribute combination according to the attributes and the data type of each attribute, wherein the first attribute combination comprises at least one selected attribute, which is one of the attributes; (b) enabling the microprocessor to determine that a product of the data distinct amount of the at least one selected attribute of the first attribute combination is greater than or equal to the data amount; (c) enabling the microprocessor to generate a determination result according to an attribute number of the at least one selected attribute of the first attribute combination; and (d) enabling the microprocessor to set the first attribute combination as a candidate key according to the determination result.

To accomplish the aforesaid objectives, certain embodiments of the present invention further provide a tangible machine-readable medium which stores a program for executing the aforesaid candidate key retrieving method. When the program is loaded into the candidate key retrieving apparatus via a computer and a plurality of codes thereof is executed, the aforesaid candidate key retrieving method can be accomplished.

According to the above description, the candidate key retrieving apparatus, the candidate key retrieving method and the tangible machine-readable medium thereof according to certain embodiments of the present invention can filter out attribute combinations that are inadequate as a candidate key according to the data amount of the table and data types of the attributes. Next, certain embodiments of the present invention retrieve a candidate key from the remaining attribute combinations according to the data distinct amount of each attribute, the data amount of the table and the attribute number of selected attributes contained in each attribute combination. In this way, the candidate key can be retrieved from a plurality of attribute combinations accurately and efficiently to mitigate the error of selecting the candidate key manually, the shortcoming of the prior art is addressed.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
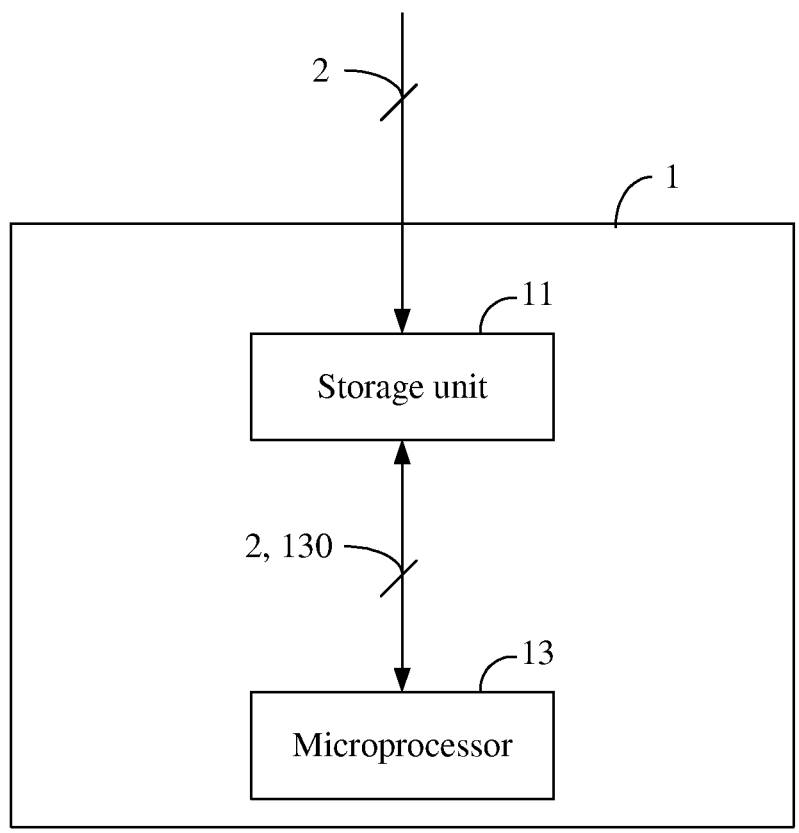
FIG. 1 is a schematic view of a first embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to embodiments thereof. The present invention relates to a candidate key retrieving apparatus, a candidate key retrieving method and a tangible machine-readable medium thereof that can retrieve a candidate key according to information recorded in a table. However, these embodiments are not intended to limit the present invention to any specific environment, applications or particular implementations described in these embodiments. Therefore, description of these embodiments is only for purpose of illustration rather than to limit the present invention. It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

A first embodiment of the present invention is shown in FIG. 1, which is a schematic view of a candidate key retrieving apparatus 1. The candidate key retrieving apparatus 1 comprises a storage unit 11 and a microprocessor 13 electrically connected to the storage unit 11. The candidate key retrieving apparatus 1 is adapted to read a table 2 from outside and store it into the storage unit 11. The table 2 records a data amount of the table, a plurality of attributes, a data distinct amount of each attribute, a data type of each attribute and a representation bit amount of each attribute.

For convenience of description, the exemplary Table II, below, for this embodiment may be a table recording basic information of students. Table II has five pieces of data, four attributes (i.e., "Gender", "Blood type", "Photograph" and "Student No."). For the attribute "Gender", the data type is a string, the representation bit amount is 1 and the data distinct amount is 2. For the attribute "Blood type", the data type is the string, the representation bit amount is 2 and the data distinct amount is 4. For the attribute "Photograph", the data type is a Binary Large Object (BLOB) picture file type, the representation bit amount is 2 and the data distinct amount is 5. For the attribute "Student No.", the data type is the string, the representation bit amount is 6 and the data distinct amount is 5.

TABLE II

| | Gender (1 bit) | Blood type (2 bits) | Photograph (2 bits) | Student No. (6 bits) |
|---|---|---|---|---|
| 1 | Male | A | imgA001 | A001 |
| 2 | Male | B | imgA002 | A002 |
| 3 | Female | AB | imgA003 | A003 |
| 4 | Female | B | imgA004 | A004 |
| 5 | Female | O | imgA005 | A005 |

When first time activated, since the candidate key retrieving apparatus 1 has not performed any candidate key retrieving process yet, there is no candidate key of the Table II available. Accordingly, the microprocessor 13 generates a first attribute combination according to the attributes and the data type of each attribute. More specifically, according to the data type of each attribute, the microprocessor 13 firstly filters out attributes that are inadequate as a candidate key, such as BLOB files or Character Large Object (CLOB) files for storing pictures, sounds, images, compressed files or the like, so that the microprocessor 13 can generate a first attribute combination that is a potential candidate key according to the remaining attributes.

As described above, the microprocessor 13 filters out the attribute "Photograph" with the data type BLOB from Table II, and then generates the first attribute combination according to the remaining attributes. The first attribute combination comprises at least one selected attribute, which is one of the attributes. Taking Table II as an example, during this stage, the microprocessor 13 generates a first attribute combination "Gender+Blood type" which comprises two selected attributes "Gender" and "Blood type".

Preferably, in this embodiment, the microprocessor 13 may further generate a plurality of attribute combinations according to the representation bit amount of each attribute and the data amount to ensure that the attribute combinations satisfy the requirement of uniqueness. For example, the representation bit amount of the attribute "Gender" is 1 bit, which indicates the attribute "Gender" can distinguish up to two pieces of data (i.e., female or male). Because the most data amount (two pieces of data) that can be distinguished by the attribute combination "Gender" is less than the data amount (five pieces of data) of table 2, the attribute combination "Gender" shall be filtered out by the microprocessor 13.

On the other hand, the representation bit amount of the attribute "Blood type" is 2 bits and a total representation bit amount of the first attribute combination "Gender+Blood type" is 3 bits, so the first attribute combination "Gender+Blood type" can distinguish up to eight pieces data (i.e., Female+A, Female+B, Female+AB, Female+O, Male+A, Male+B, Male+AB, and Male+O). Because the most data amount (eight pieces of data) that can be distinguished by the first attribute combination "Gender+Blood type" is greater than the data amount (five pieces of data) of table 2, the first attribute combination "Gender+Blood type" is kept by the microprocessor 13.

Next, the microprocessor 13 determines whether there is a candidate key already stored in the storage unit 11. As mentioned before, this is the first time the candidate key retrieving apparatus 1 being activated, no candidate key has been stored in the storage unit 11 yet. After it is determined that no candidate key has been stored in the storage unit 11, the microprocessor 13 will perform a next determination on the first attribute combination "Gender+Blood type".

More specifically, the microprocessor 13 will determine whether a product of the data distinct amounts of the selected attributes (i.e., "Gender" and "Blood type") of the first attribute combination "Gender+Blood type" is greater than or equal to the data amount. Based on the above description of Table II, the data distinct amount of the selected attribute "Gender" is 2, and that of the selected attribute "Blood type" is 4, therefore the product of the data distinct amounts of the selected attributes "Gender" and "Blood type" (i.e., 8) is greater than the data amount (i.e. 5). Subsequently, the microprocessor 13 determines that the product of the data distinct amounts of the selected attributes (i.e., "Gender" and "Blood type") of the first attribute combination "Gender+Blood type" is greater than or equal to the data amount.

After determining that the product of the data distinct amounts of the selected attributes (i.e., "Gender" and "Blood type") of the first attribute combination "Gender+Blood type" is greater than or equal to the data amount, the microprocessor 13 generates a determination result according to the attribute number of the selected attributes of the first attribute combination "Gender+Blood type", and sets the first attribute combination "Gender+Blood type" as a candidate key 130 according to the determination result.

In more detail, the microprocessor 13 determines whether the attribute number of the selected attributes of the first attribute combination "Gender+Blood type" is greater than 1. If not, the first attribute combination will be set as a candidate key 130. However, the first attribute combination "Gender+Blood type" comprises two selected attributes "Gender" and "Blood type", so the determination result is that the attribute number of the selected attributes of the first attribute combination "Gender+Blood type" is greater than 1. Consequently, a next determination has to be made according to this determination result.

The microprocessor 13 then unites the selected attributes "Gender" and "Blood type" together to generate a united attribute combination, and calculates a united data distinct amount of the united attribute combination according to Table II and the united attribute combination. Thereafter, the microprocessor 13 determines whether the united data distinct amount is greater than or equal to the data amount. If yes, then the first attribute combination "Gender+Blood type" is set as the candidate key 130 and stored into the storage unit 11. Otherwise, the first attribute combination "Gender+Blood type" shall not be set as the candidate key 130.

For example, as shown in Table II, the united attribute combination comprises "Male+A, Male+B, Female+B, Female+AB, Female+O", so the united data distinct amount is 5, which is equal to the data amount (five pieces). Therefore, the first attribute combination "Gender+Blood type" is set as the candidate key 130 and stored into the storage unit 11. Thus, the candidate key "Gender+Blood type" 130 is generated.

Upon generating the candidate key "Gender+Blood type" 130, the microprocessor 13 may further generate a second attribute combination "Gender+Blood type+Student No." according to the data types, the attributes, the representation bit amounts and the data amount, then determines whether a candidate key 130 has already existed in the storage unit 11.

As the candidate key "Gender+Blood type" 130 has already been stored in the storage unit 11, the microprocessor 13 determines that a candidate key 130 has already been stored in the storage unit 11 and perform an AND logic operation on the candidate key "Gender+Blood type" 130 (which may also be referred as the first attribute combination "Gender+Blood type") and the second attribute combination "Gender+Blood type+Student No." to generate an operation result. Then the microprocessor 13 determines whether the operation result is equal to the candidate key "Gender+Blood type" 130. If yes, it means that the second attribute combination "Gender+Blood type+Student No." does not satisfy the requirement of minimality and shall be eliminated; otherwise, the microprocessor 13 will proceed to make the aforesaid determinations on the second attribute combination "Gender+Blood type+Student No." in respect of the data distinct amount and the united attribute combination.

Preferably, the selected attributes contained in each of the aforesaid attribute combinations may be represented by a bit set. More specifically, in an order of (Gender, Blood type, Photograph, Student No.), the candidate key "Gender+Blood type" 130 may be represented as (1100), and the second attribute combination "Gender+Blood type+Student No." may be represented as (1101). The microprocessor 13 performs the AND logic operation on the candidate key 130 (i.e. 1100) and the second attribute combination (i.e. 1101) to generate a calculation result of (1100), which is equal to the candidate key 130 (i.e. 1100). Then, the microprocessor 13 determines that the second attribute combination "Gender+Blood type+Student No." does not satisfy the requirement of minimality and shall be eliminated.

In other embodiments, if an attribute combination comprises three selected attributes, namely, a first selected attribute, a second selected attribute and a third selected attribute, the microprocessor 13 may unite the first selected attribute and the second selected attribute as a first united attribute combination, unites the second selected attribute and the third selected attribute as a second united attribute combination, and determines whether the united data distinct amounts of the first united attribute combination and the second united attribute combination are greater than or equal to the data amount respectively. If yes, a candidate key is set in the way described above; otherwise, the microprocessor 13 may continue to unite the attribute combinations and repeat the aforesaid steps. The present invention has no limitation on how the selected attributes united and how the united attribute combinations generated, the way how the attribute combinations united can be devised by those of ordinary skill in the art depending on practical needs.

FIGS. 2A-2E show a second embodiment of the present invention, which is a candidate key retrieving method for a candidate key retrieving apparatus as described in the first embodiment. The candidate key retrieving apparatus comprises a microprocessor and a storage unit electrically connected to the storage unit. The storage unit is configured to store a table recording a data amount of the table, a plurality of attributes, a data distinct amount of each attribute, a data type of each attribute and a representation bit amount of each attribute.

Furthermore, the candidate key retrieving method of the second embodiment may be implemented by a computer program product, when the computer program product being loaded into the candidate key retrieving apparatus via a computer, a plurality of codes contained therein is executed to accomplish the candidate key retrieving method of the second embodiment. The computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 2A:
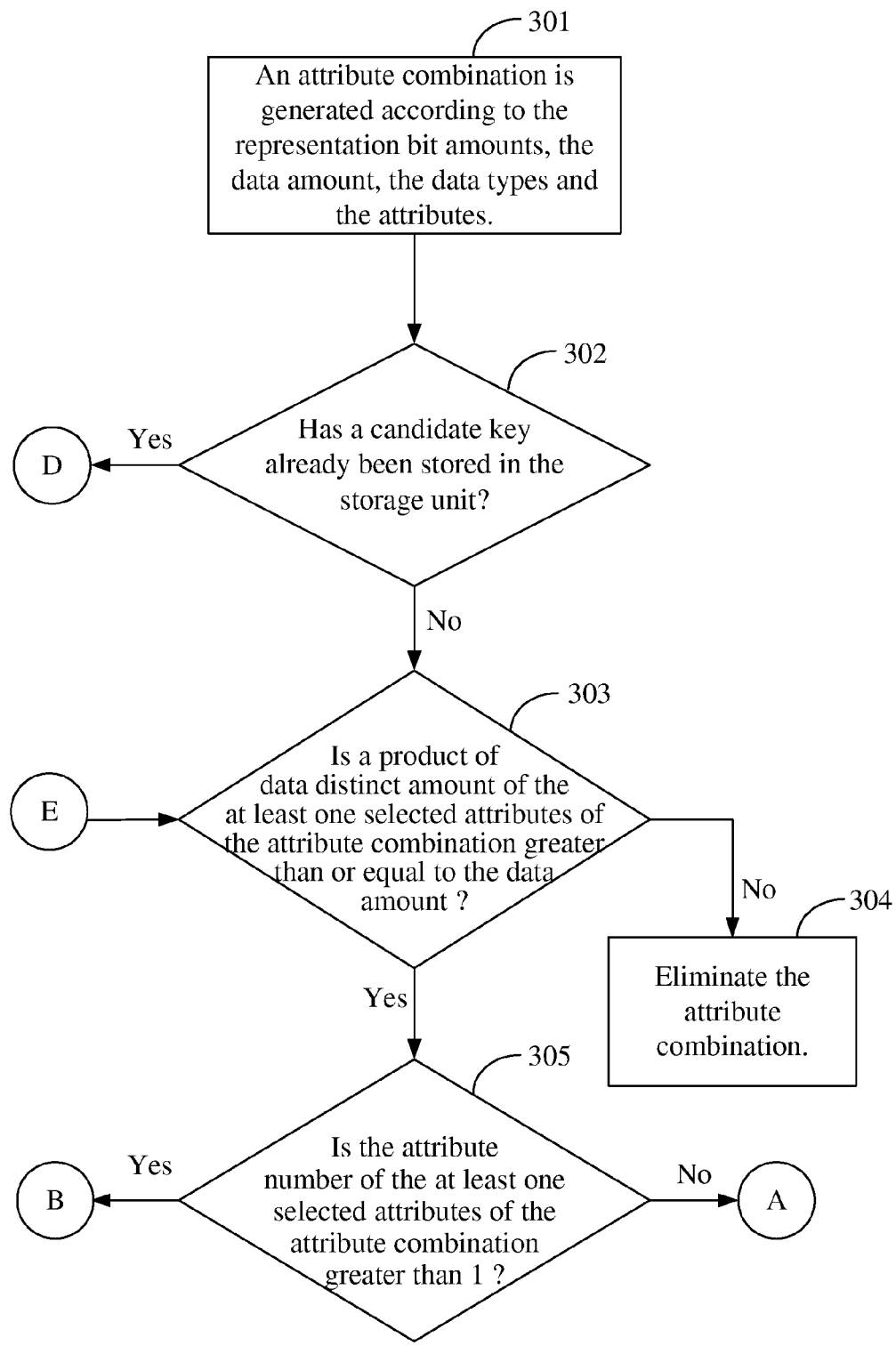
FIG. 2A-2E is a flowchart of a second embodiment of the present invention.

The candidate key retrieving method of the second embodiment comprises the following steps. Referring to FIG. 2A, initially, step 301 is executed to enable the microprocessor to generate an attribute combination according to the data type of each attribute, the data amount, the representation bit amounts and the attributes. Details of how the attribute combination generated have already been described in the first embodiment, thus will not be further described herein. The attribute combination has at least one selected attribute, which corresponds to the attributes contained in the table.

Next, the microprocessor determines whether a candidate key has already been stored in the storage unit in step 302. If yes, then referring to FIG. 2E, step 311 is executed to enable the microprocessor to perform an AND operation on the attribute combination and the candidate key to generate an operation result. Then, the microprocessor determines whether the operation result is equal to the candidate key in step 312. If yes, then it means that the attribute combination does not satisfy the requirement of minimality, step 304 is executed to enable the microprocessor to eliminate this attribute combination.

Referring back to FIG. 2A, if it is determined in step 302 that a candidate key has not already been stored in the storage unit, or it is determined in step 312 that the operation result is not equal to the candidate key, then step 303 is executed to enable the microprocessor to determine whether a product of data distinct amount of the at least one selected attribute contained in the attribute combination is greater than or equal to the data amount. If not, then step 304 is executed to enable the microprocessor to eliminate this attribute combination.

Figure 2B:
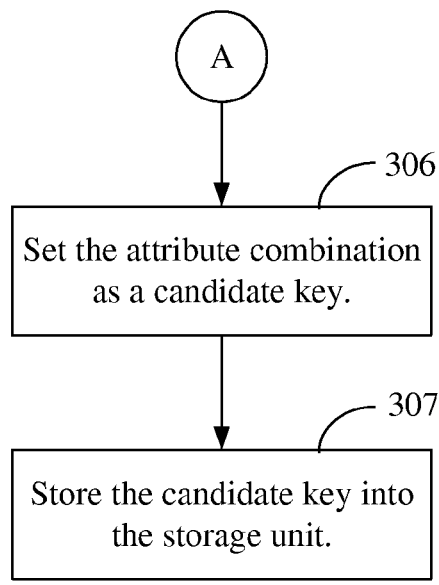

If it is determined in step 303 that the product of data distinct amount of the at least one selected attribute contained in the attribute combination is greater than or equal to the data amount, then step 305 is executed to enable the microprocessor to determine whether an attribute number of the at least one selected attribute contained in the attribute combination is greater than 1. Referring to FIG. 2B together, if not, then step 306 is executed to enable the microprocessor to set the attribute combination as a candidate key, and step 307 is executed to enable the microprocessor to store the candidate key into the storage unit.

Figure 2C:
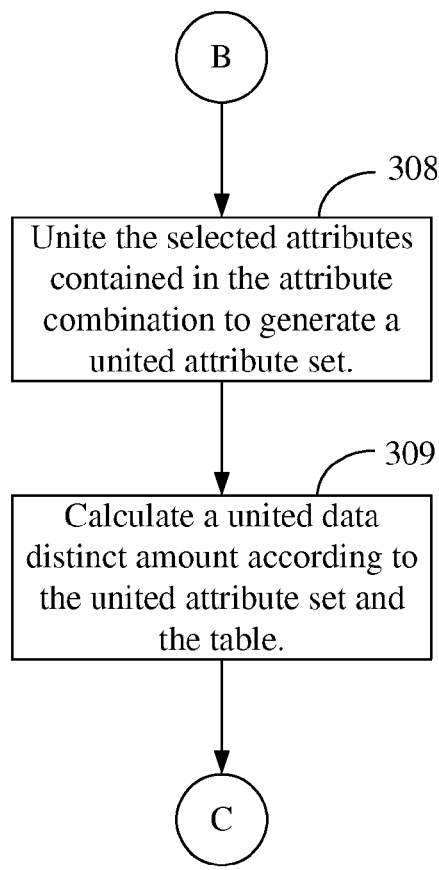

Referring to FIG. 2C, if it is determined in step 305 that the attribute number of the at least one selected attribute contained in the attribute combination is greater than 1, step 308 is executed to enable the microprocessor to unite the selected attributes contained in the attribute combination to generate a united attribute combination, and then step 309 is executed to enable the microprocessor to calculate a united data distinct amount according to the united attribute combination and the table.

Figure 2D:
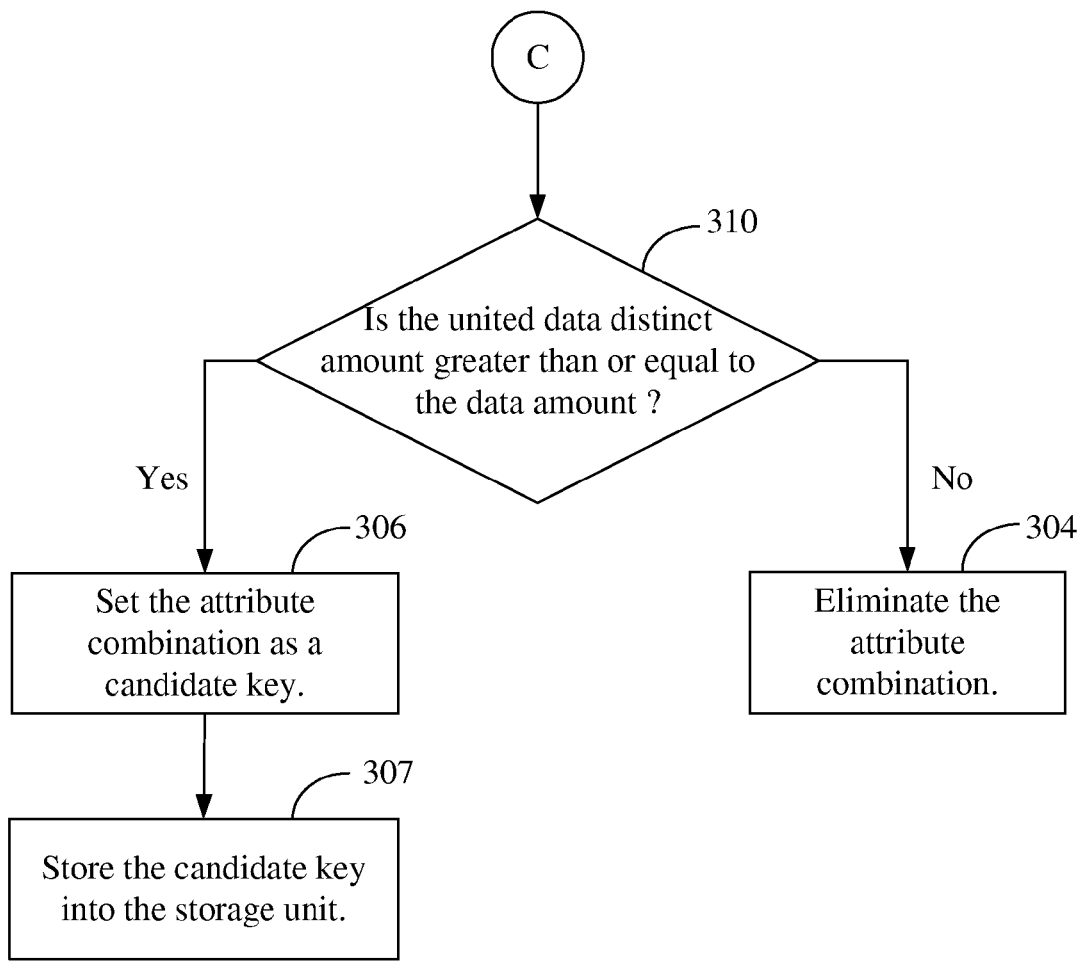
Figure 2E:
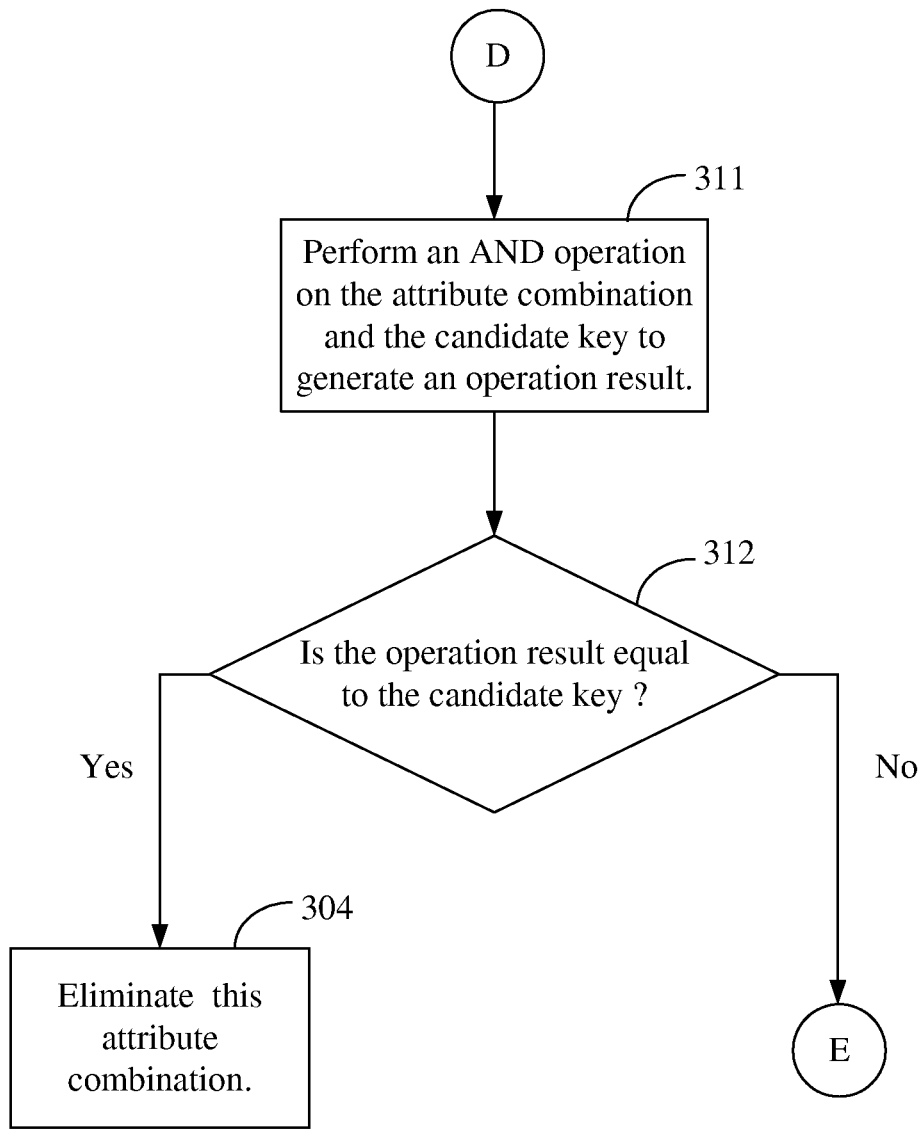

Next, referring to FIG. 2D, step 310 is executed to enable the microprocessor to determine whether the united data distinct amount is greater than or equal to the data amount. If not, step 304 is executed to enable the microprocessor to eliminate the attribute combination. Otherwise, step 306 is executed to enable the microprocessor to set the attribute combination as a candidate key, and then step 307 is executed to enable the microprocessor to store the candidate key into the storage unit.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above description, the candidate key retrieving apparatus, the candidate key retrieving method and the tangible machine-readable medium thereof according to the present invention can filter out, according to the data amount of the table and data types of the attributes, attribute combinations that are inadequate as a candidate key, and then retrieve a candidate key from the remaining attribute combinations according to the data distinct amount of each attribute, the data amount of the table and the attribute number of selected attributes contained in each attribute combination. In this way, the candidate key can be retrieved from a plurality of attribute combinations accurately and efficiently to mitigate the error of selecting candidate key manually, thereby addressing the shortcoming of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for setting a candidate key for a table, the method being used in an apparatus comprising a microprocessor and a storage unit electrically connected to the microprocessor, the storage unit being configured to store the table, the table recording a data amount of the table, a plurality of attributes of the table, a data distinct amount of each attribute and a data type of each attribute, the method comprising the following steps of:

(a) enabling the microprocessor to generate a first attribute combination according to the attributes and the data type of each attribute, wherein the first attribute combination comprises a plurality of selected attributes, each of the selected attributes is one of the attributes, each of the selected attributes corresponds to a representation bit amount, each of the representation bit amount being used to determine the data distinct amount of the corresponding attribute;

(b1) enabling the microprocessor to calculate a product of the data distinct amount of the selected attributes;

(b2) enabling the microprocessor to determine that a product of the data distinct amount of the selected attributes is greater than or equal to the data amount;

(c) enabling the microprocessor to generate a determination result according to an attribute number of the selected attributes of the first attribute combination; and (d) enabling the microprocessor to set the first attribute combination as the candidate key of the table according to the determination result.

2. The method of claim 1, wherein the table further records a representation bit amount of each attribute, and step (a) further enables the microprocessor to generate the first attribute combination according to the representation bit amounts, the data amount, the data types and the attributes.

3. The method of claim 1, wherein the first attribute combination comprises a plurality of selected attributes, the candidate key retrieving method further comprising the steps of:

(e) enabling the microprocessor to unite the selected attributes according to the determination result to generate an united attribute combination;

(f) enabling the microprocessor to calculate an united data distinct amount of the united attribute combination according to the united attribute combination and the table; and (g) enabling the microprocessor to determine that the united data distinct amount is greater than or equal to the data amount, to set the first attribute combination as the candidate key.

4. The method of claim 1, wherein a second attribute combination is further generated in step (a), the candidate key retrieving method further comprising the steps of:

(h) enabling the microprocessor to perform an AND logic operation on the candidate key and the second attribute combination to generate an operation result; and (i) enabling the microprocessor to determine that the operation result is unequal to the candidate key.

5. An apparatus for setting a candidate key for a table, comprising:

a storage unit, being configured to store the table, wherein the table records a data amount of the table, a plurality of attributes of the table, a data distinct amount of each attribute and a data type of each attribute; and a microprocessor, being electrically connected to the storage unit and configured to:

generate a first attribute combination according to the attributes and the data type of each attribute, wherein the first attribute combination comprises a plurality of selected attributes, each of the selected attributes is one of the attributes, each of the selected attributes corresponds to a representation bit amount, each of the representation bit amount being used to determine the data distinct amount of the corresponding attribute;

calculate a product of the data distinct amount of the selected attributes;

determine that a product of the data distinct amount of the selected attributes is greater than or equal to the data amount;

generate a determination result according to an attribute number of the selected attributes of the first attribute combination; and set the first attribute combination as a candidate key according to the determination result.

6. The apparatus of claim 5, wherein the table further records a representation bit amount of each attribute, and the microprocessor is further configured to generate the first attribute combination according to the representation bit amounts, the data amount, the data types and the attributes.

7. The apparatus of claim 5, wherein the first attribute combination comprises a plurality of selected attributes, and the microprocessor is further configured to:

unite the selected attributes according to the determination result to generate an united attribute combination;

calculate an united data distinct amount of the united attribute combination according to the united attribute combination and the table; and determine that the united data distinct amount is greater than or equal to the data amount to set the first attribute combination as the candidate key.

8. The apparatus of claim 5, wherein the microprocessor is further configured to:

generate a second attribute combination according to the attributes and the data type of each attribute;

perform an AND logic operation on the candidate key and the second attribute combination to generate an operation result; and determine that the operation result is unequal to the candidate key.

9. A tangible machine-readable medium storing a program of a method for setting a candidate key for a table, the method being used in an apparatus comprising a microprocessor and a storage unit electrically connected to the microprocessor, the storage unit being configured to store the table, the table recording a data amount of the table, a plurality of attributes of the table, a data distinct amount of each attribute and a data type of each attribute, the program is loaded into the apparatus via a computer and then executed, the program comprising:

a code A for enabling the microprocessor to generate a first attribute combination according to the attributes and the data type of each attribute, wherein the first attribute combination comprises a plurality of selected attributes, each of the selected attributes is one of the attributes, each of the selected attributes corresponds to a representation bit amount, each of the representation bit amount being used to determine the data distinct amount of the corresponding attribute;

a code B1 for enabling the microprocessor to calculate a product of the data distinct amount of the selected attributes;

a code B2 for enabling the microprocessor to determine that a product of the data distinct amount of the selected attributes is greater than or equal to the data amount;

a code C for enabling the microprocessor to generate a determination result according to an attribute number of the selected attributes of the first attribute combination; and a code D for enabling the microprocessor to set the first attribute combination as the candidate key of the table according to the determination result.

10. The tangible machine-readable medium of claim 9, wherein the table further records a representation bit amount of each attribute, and the code A further enables the microprocessor to generate the first attribute combination according to the representation bit amounts, the data amount, the data types and the attributes.

11. The tangible machine-readable medium of claim 9, wherein the first attribute combination comprises a plurality of selected attributes, and the program further comprises:

a code E for enabling the microprocessor to unite the selected attributes according to the determination result to generate an united attribute combination;

a code F for enabling the microprocessor to calculate an united data distinct amount of the united attribute combination according to the united attribute combination and the table; and a code G for enabling the microprocessor to determine that the united data distinct amount is greater than or equal to the data amount to set the first attribute combination as the candidate key.

12. The tangible machine-readable medium of claim 9, wherein the code A further enables the microprocessor to generate a second attribute combination, and the program further comprises:

a code H for enabling the microprocessor to perform an AND logic operation on the candidate key and the second attribute combination to generate an operation result; and a code I for enabling the microprocessor to determine that the operation result is unequal to the candidate key.

* * * * *